United States Patent [19]

Tiso

[11] Patent Number: 5,696,599
[45] Date of Patent: Dec. 9, 1997

[54] METHOD AND APPARATUS FOR MODIFYING HANDSHAKE DATA TRANSMISSIONS

[75] Inventor: William J. Tiso, Sparta, N.J.

[73] Assignee: Novell, Inc., Provo, Utah

[21] Appl. No.: 366,805

[22] Filed: Dec. 30, 1994

[51] Int. Cl.$^6$ .................................................... H04N 1/00
[52] U.S. Cl. .................................... 358/434; 358/437
[58] Field of Search ............................ 358/434–440, 358/400, 500, 524; 375/222

[56] References Cited

U.S. PATENT DOCUMENTS

| 4,905,282 | 2/1990 | McGlynn et al. | 375/222 |
| 4,953,210 | 8/1990 | McGlynn et al. | 375/222 |
| 5,206,743 | 4/1993 | Hochman et al. | 358/440 |
| 5,438,436 | 8/1995 | Harris | 358/504 |

*Primary Examiner*—Edward L. Coles, Sr.
*Assistant Examiner*—Stephen Brinich
*Attorney, Agent, or Firm*—Dinsmore & Shohl LLP

[57] ABSTRACT

A method and apparatus for modifying communications handshake data includes the interception of a first handshake transmission generated by a local unit in response to a request from a remote unit. The intercepted transmission is prevented from being transmitted to the remote unit, and stored and modified as desired. The remote unit is prompted to send a second request to the local unit. The local unit's response transmission is again intercepted, the stored and modified transmission being sent in lieu of the intercepted transmission. The invention may be used for the modification of facsimile TSI data to provide routing codes in accordance with U.S. Pat. No. 5,206,743.

20 Claims, 3 Drawing Sheets

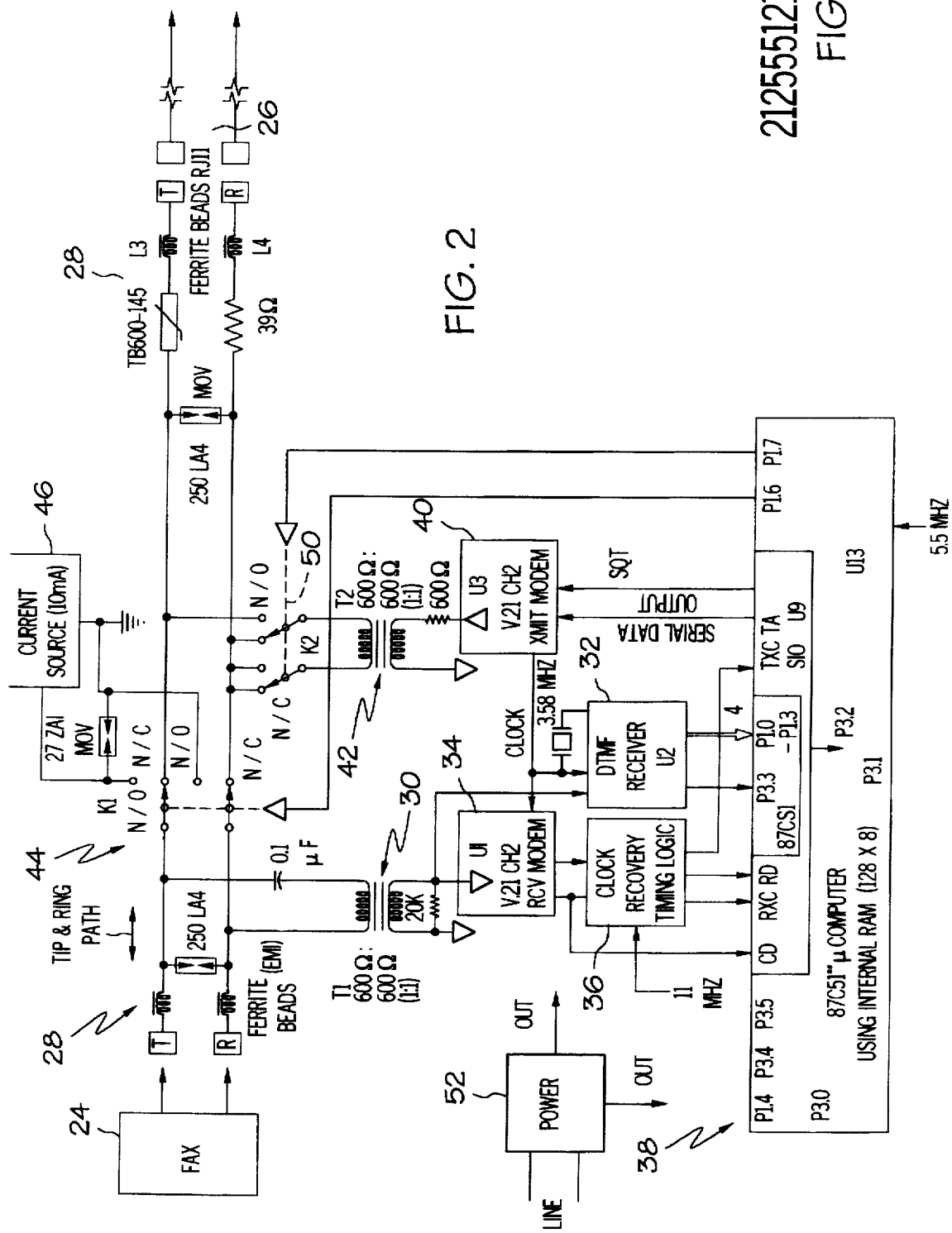

METHOD AND APPARATUS FOR MODIFYING HANDSHAKE DATA TRANSMISSIONS

The present invention relates to the electrical arts and in particular to a method and apparatus for modifying data, such as handshake data, transferred between communications equipment, such as facsimile machines, in a manner which can allow, for example the subsequent routing of a facsimile message in a network environment.

BACKGROUND OF THE INVENTION

In U.S. Pat. No. 5,206,743 ("the '743 patent") the disclosure of which is incorporated herein by reference, there is disclosed and claimed a methodology for directing a facsimile message communication to an intended recipient at a remote location by inserting into the facsimile transmission, at the transmitting location, an identification number which is received and associated by the remote reception apparatus for routing the received fax to its intended recipient through a network server coupled to the facsimile receiver. The identification number is preferable inserted into, and transmitted as part of, a handshake data field which is transmitted from the sending to the receiving facsimile apparatus prior to transmission of the actual facsimile image.

Typically, the invention of the '743 patent may be incorporated through software into a facsimile apparatus to provide the apparatus with the capability of altering a handshake data field to accept the identification number for transmission and to retrieve the identification number data from the transmitted field upon receipt without otherwise affecting facsimile apparatus operation. It is to be appreciated, however, that there exists a significant need for a method and apparatus which can be embodied in a stand-alone environment and which can be coupled to a conventional facsimile apparatus to permit the facsimile apparatus to communicate with a network-associated facsimile apparatus having the routing capability provided by the '743 patent and transmit appropriate routing information thereto.

It is accordingly a purpose of the present invention to provide a methodology by which the teaching of the '743 patent may be practiced to allow facsimile routing to be initiated by a conventional facsimile machine.

More generally, it is a purpose of the present invention to provide a method and apparatus by which a data field intended to be transmitted between two communications units such as facsimile equipment, can be altered during the course of a transmission session.

Another purpose of the present invention is to provide a method and apparatus by which a facsimile handshake signal can be intercepted, modified and retransmitted without disrupting interconnection between facsimile units.

Yet a further purpose of the present invention is to provide a method and apparatus by which handshake modification data may be transmitted by a first facsimile unit as an annex to a telephone number, and subsequently used to modify a handshake field being transmitted from the first facsimile unit as a facsimile sending unit to a second receiving facsimile unit.

BRIEF DESCRIPTION OF THE INVENTION

In accordance with the present invention, an apparatus and method are provided whereby a communications device, such as a transmitting facsimile apparatus, transmitting a data field to be modified, is interfaced with a conventional transmission channel, such as a telephone line and system, through an apparatus which identifies the field to be modified and sends an appropriately -modified data field to the receiver apparatus in its place without substantively affecting the transmissions. Such apparatus preferably embodies methodology which allows the modifying data to be received by the apparatus as part of a transmission initiated by the transmitting communications device, such as a suffix to the telephone number of the receiving device when the communications devices are linked by a common carrier telephone line.

When the transmitting unit is prompted for the data to be modified the apparatus of the present invention intercepts such data, preventing the data from reaching the requesting unit, but in a manner which nevertheless preserves the interconnection between the devices. The intercepted data is modified as required and stored for subsequent transmission.

The remote unit is caused to resend its data prompt, the previously stored data being sent by the invention's apparatus in response, in place of the original data which would be resent by the transmitting unit. The modified data is received by the remote apparatus, and is processed as intended.

In a preferred embodiment, the present invention operates in connection with a transmitting or calling facsimile apparatus whose handshake signal is to be modified to take advantage of the invention of the '743 patent. The transmitting and receiving or called facsimile units are coupled through a conventional common carrier-provided telephone line and system. The telephone number of the receiving fax apparatus to be dialed is placed on the telephone line by the local transmitting fax apparatus in conjunction with a following identification or routing code to be inserted into the handshake signal. The routing code is received by the apparatus of the present invention, which is coupled to the transmitting unit and the telephone line, and is stored for subsequent use.

The call-initiating transmission is placed by the local fax apparatus in a conventional manner, the remote receiving fax apparatus acknowledging the call and commencing transmission of Remote Phase B handshake data which, upon receipt, prompts the local unit to respond with its Local Phase B handshake. The Local Phase B handshake data is intercepted, preventing it from reaching the transmitting fax apparatus while preserving the interconnection between the fax machines.

Because the Local Phase B handshake data which would be normally transmitted by the local fax apparatus does not include the required modification which allows routing to be accomplished by the remote apparatus, the intercepted Local Phase B handshake signal is stored and modified with the previously-stored modification. Simultaneously the remote facsimile apparatus is sent a signal which maintains the telephone line connection and keeps the remote facsimile apparatus in a data-awaiting mode.

During the time the Local Phase B handshake data is stored and modified, the remote facsimile apparatus resends its initial handshake data, reprompting the local apparatus for its callback handshake data. The resent handshake data is allowed to be passed to the local fax apparatus, which again sends its response handshake. Once again, this data is diverted from the telephone line, the previously stored and modified handshake data, being sent by the invention's apparatus in its place. The modified Phase B handshake data is received by the remote fax apparatus, which retrieves the identification data and stores it as needed for subsequent routing purposes. Appropriate additional coupling transmissions between the units are performed in a conventional manner, followed by image transfer as known in the art.

BRIEF DESCRIPTION OF THE DRAWINGS

A fuller understanding of the present invention and the features and capabilities thereof will be obtained upon consideration of the following detailed, but nonetheless illustrative, embodiment of the invention, when reviewed in connection with the annexed figures wherein:

FIG. 2 is a schematic diagram of the apparatus of the present invention; and

FIG. 3 is a representation of a telephone dial string including handshake modification data.

DETAILED DESCRIPTION OF THE INVENTION

Figure 1:
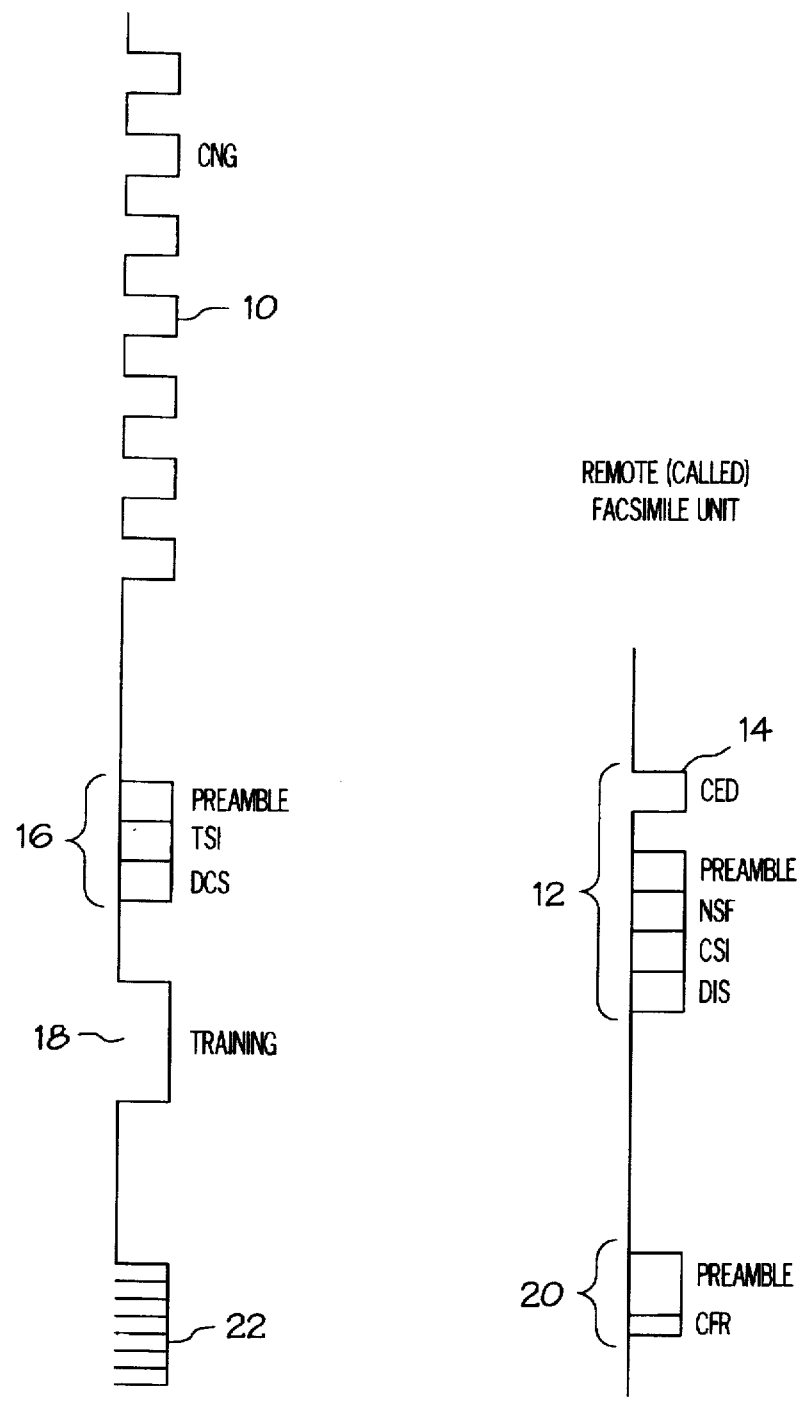
FIG. 1 is a representation of a conventional facsimile transmission.

Referring initially to FIG. 1, a conventional facsimile transmission between a local or calling facsimile apparatus sending the transmission and a remote or called facsimile apparatus receiving the transmission over a common carrier telephone system commences at 10 with the creation and sending of a telephone dial string, typically DTMF (dual tone multiple frequency) pulses on the telephone line to which the local fax machine is connected, the dial string being utilized by the telephone system provider to route the call to the location of the telephone number of the remote facsimile apparatus. Upon receipt of the call by the remote apparatus, the remote apparatus generates an initial set of handshake data 12 which confirms the opening of a communication line between the sending and receiving units, and which provides the local apparatus with the appropriate information regarding the receiving unit. Such data, which is in a standardized format, includes a CED tone 14 which is a acknowledgement that a non-voice terminal has answered the call, followed by initial Remote Phase B data segments, denoted as the Preamble, followed by NSF, CSI and DIS fields, which particularly identify the remote apparatus and its characteristics. This data is transmitted in accordance with the known T30 protocol. The transmitted data is received by the local fax unit, which responds with its Local Phase B data, comprising a Preamble followed by TSI and DCS fields 16.

In accordance with the '743 patent, one of the fields 16, typically the TSI field, is utilized to provide routing data to be used by the remote facsimile apparatus. In a conventional facsimile apparatus, however, the TSI field generated in response to the received handshake data does not include any such routing data. The fields 16 normally provide the remote fax apparatus with confirmation that its transmission 12 was received by the local apparatus, and provide equivalent information for the remote fax apparatus to allow subsequently-transmitted image data to be received. After broadcast of the string 16 a so-called training signal 18, also referred to as the Training Check Frame, is broadcast, which allows the remote units to synchronize its operation with the local unit. The remote apparatus then follows with a CFR or Confirm For Receive signal, acknowledging that the training signal was successfully received, and that image data may be sent by the local unit. The actual facsimile data 22 is then transmitted.

Because line conditions and interference can result in incomplete or distorted transfer of handshake data, the T30 protocol allows for the retransmission of the remote fax unit's handshake data 12 if either the returned signal 16 is incomplete or incorrect, or if no response is received by the remote apparatus within a given wait period. The present invention utilizes this capability, capturing the responding local handshake string 16, and preventing it from being received by the remote unit. The captured data string is modified to include the routing data and the remote machine is prompted to issue a second handshake string. This second handshake string is passed to the local fax apparatus, which interprets it as an indication that its previous response handshake was not received by the remote unit, and accordingly reissues its handshake. The new handshake is again intercepted by the apparatus, this time the apparatus sending in its place the modified handshake string having the routing data. The remote machine receives the modified handshake, followed by a second training string 18 generated by the local unit which the invention's apparatus allows to be passed from the local apparatus, and responds with the CFR signal 20, initiating actual transmission of the facsimile image data.

As may be seen in FIG. 2, an apparatus embodying the present invention is coupled between the local facsimile apparatus 24 and the telephone line 26, typically by use of conventional RJ11 connectors. Appropriate line protection components 28, as known in the art, may be utilized to protect the apparatus of the invention, as well as the attached facsimile apparatus, from voltage transients and the like.

Signals on the telephone line, generated either by the local fax unit or the remote fax unit, are detected and routed to the apparatus by coupling transformer 30, the output of which is directed both to the DTMF receiver 32, which is capable of decoding DTMF telephone routing signals, as well as to modem 34, which is capable of detecting and demodulating the handshake signals passing between the facsimile units. Both the DTMF receiver and modem are of conventional construction. The output of modem 34 is conditioned by known clock recovery and timing logic means 36 and is passed, along with the output of DTMF receiver 32, to microprocessor 38, which may be a 87C51 unit having appropriate internal RAM programmed in a conventional manner for processing the data in accordance with the present invention.

The normally closed contacts of relay 44 couple the telephone line to the local facsimile machine 24, while the normally open contacts lead to a constant current source 46. When the relay is activated by microprocessor 30, to which the relay coil is coupled, the local facsimile machine is disconnected from the telephone line and is connected to current source 46, which provides a sufficient signal on the fax unit to maintain it in its connected state.

Microprocessor 30 also drives transmit modem 40, which is utilized to generate the necessary replacement handshake signals for delivery to the remote fax apparatus. The output of modem 40 feeds second isolation transformer 42, the output of which is coupled to the telephone line through the normally open contacts of second relay 50, also controlled by the microprocessor. It is to be noted that the output of the transmit modem is coupled to the telephone line side of isolation relay 44. Power is supplied to the components of the apparatus by power supply 52, which may include appropriate known circuitry to provide both regulated and unregulated voltages as required by the operating components.

Figure 4:
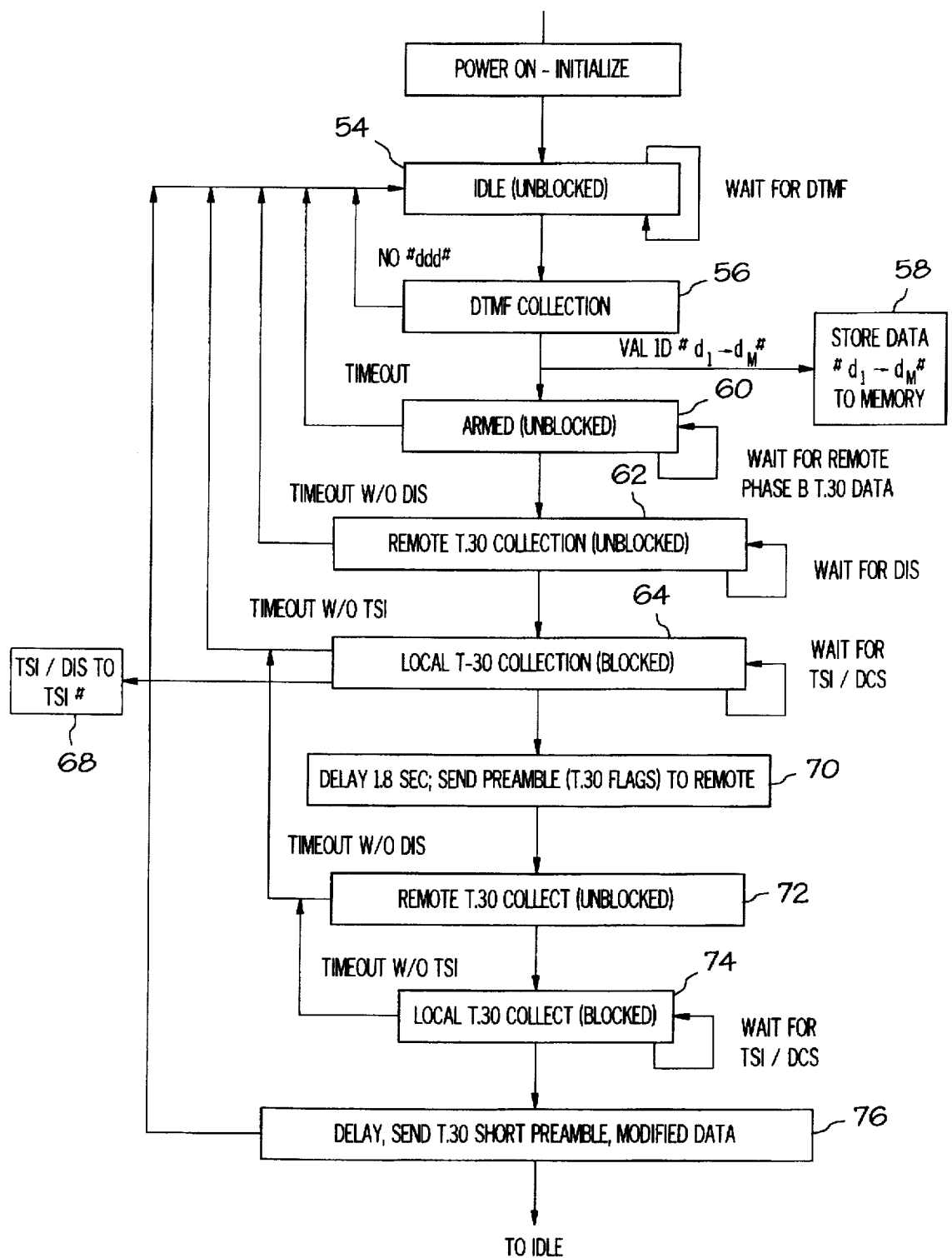
FIG. 4 is a state diagram of the operation of the apparatus of the present invention.

The methodology of the present invention as embodied in the operation of the apparatus of FIG. 2 is as follows, which is further illustrated in FIG. 4.

In accordance with the teachings of the '743 patent, the user of the local facsimile apparatus 24 will typically enter the telephone number of the remote fax unit having routing capability through the local facsimile unit's dialing keypad, followed by a pound (#) sign, the routing identification for the specific recipient coupled to the remote facsimile unit, followed by another pound sign, as shown is FIG. 3. In accordance with the local facsimile unit's normal operation in the transmitting mode, the telephone number and routing information is passed out as DTMF tones over the telephone line through the telephone system to access the telephone number of the remote facsimile machine.

Common carrier telephone systems are designed to ignore all information or tone signals commencing with a pound sign. Accordingly, the routing information neither affects the dial-up of the called telephone number, nor is transmitted past the local central office or PBX thereto. With the invention apparatus in the "standby" or idle state 54, with relay 44 unenergized, the local fax unit is "unblocked", and its DTMF signals pass to the telephone line unimpeded. Since DTMF receiver 32 is coupled across the fax unit's output, however, it waits for and receives the entire DTMF string, including the routing information, which is collected at 56 and passed to the microprocessor 38. The microprocessor identifies the routing code portion $d_1$ through $d_n$ of the transmission by reference to the # characters and stores it at 58 for subsequent use. Identification of the routing code also initiates active or armed operation of the apparatus at 60.

The apparatus now awaits the transmission of the initial Phase B handshake data from the called remote fax apparatus, which is passed to the local fax unit since relay 44 remains unenergized. While the local fax machine is receiving the handshake data from the remote unit, that data is similarly being intercepted by the apparatus at 62, decoded by modem 34, and processed by the microprocessor. When the end of the handshake signal is identified, microprocessor 38 activates relay 44, disconnecting the local fax apparatus from the telephone line, placing it in the "blocked" state and preventing its subsequent output from being delivered to the remote fax apparatus. At the same time current source 46 is coupled to the local fax unit, allowing it to continue to "see" a coupled telephone line, as may be required by the local fax unit.

As the remote unit's handshake transmission was received by the local fax apparatus, it responds by sending its handshake data. This data is blocked from the telephone line and the remote fax apparatus by the operation of relay 44, but is received by modem 34 at 64 and passed to the microprocessor where it is stored. The microprocessor identifies the TSI portion of the transmission, and modifies it by inclusion of the previously stored identification data at 68. The modified data string will be subsequently forwarded to the remote facsimile apparatus to provide the remote fax with the appropriate routing information.

In order to resend the modified TSI information in a manner which will be accepted and recognized by the receiving fax apparatus, the remote fax must recognize the transmission as a TSI field. This is accomplished by causing the remote facsimile apparatus to re-request the local unit's handshake by resending its initial handshake. The re-request must occur, however, after the local unit has finished resending its initial, intercepted handshake. Otherwise, the local unit will not be in a condition to receive a transmission from the remote unit.

In particular, after the remote fax apparatus sends its handshake, it immediately looks for the response from the local unit. The delay required by the apparatus of the present invention to receive the response handshake transmission from the local fax apparatus and modify it as required for retransmission would ordinarily be unacceptable to the remote apparatus. By the time the information was assembled by the apparatus, the connection with the remote unit would be severed or the remote unit would re-send its handshake, which the local unit could not accept, ultimately leading to a disconnect. Accordingly, the apparatus must provide a mechanism by which the connection is maintained and the remote unit delayed in resending its handshake unit the local unit can accept it.

Normally, a second handshake is sent by the remote unit if the local unit sends a data string which is unintelligible to the remote apparatus or no signal is received for a certain interval. Because there is a maximum time during which the remote facsimile machine will either accept unintelligible data or observe a no signal condition before it resends, microprocessor 38 creates a combination of a delay followed by a data transmission at 70 which maintains the line connection but is unintelligible to the remote fax unit, such a combination providing a sufficient delay to the remote unit to allow the local fax unit to send its entire blocked response and then enter a wait state for the subsequent transmission from the remote unit. It has been found that the creation of a no signal delay of 1.8 seconds, followed by the transmission of a series of T30 preamble flags, but without following data, to create a total delay of no more than 2.45 seconds, maintains the connection with the remote unit, properly prompts the remote unit for transmission of a second handshake, and simultaneously allows the local fax apparatus to complete its initial handshake and training transmission.

After the transmission of the T30 flags, the modem 34 and microprocessor 38 await the end of the local unit's training transmission, which has been occurring during the latter part of the overall delay period. With a correct choice of delay period, this should occur immediately after the end of the delay period. When the end of the training transmission is sensed, relay 44 is deenergized, recoupling the local fax apparatus to the line. The second handshake string transmitted by the remote unit is then received by both the local fax unit and the apparatus of the invention at 72, the local unit "recognizing" that its first response handshake was not properly received and acknowledged by the remote unit. Accordingly, it transmits a second handshake response.

Once again, however, the apparatus, who's receive modem 34 has similarly been recoupled to the line, has received the second remote transmission. In order to prevent the local machine from sending its response, which would still include the unmodified TSI, the apparatus awaits the end of the second remote handshake signal, and at that point re-energizes relay 44, again disconnecting and blocking the local fax apparatus from the telephone line. At the same time, however, transmit modem 40 is activated by the microprocessor and coupled to the telephone line by energizing relay 50. The microprocessor then sends the stored handshake data it previously received from the local unit, including the modified TSI signal having the desired routing code at 76. This revised handshake is sent during the time the local apparatus is generating its blocked second response handshake, which is collected by the apparatus at 74.

In a currently-preferred embodiment, the modems 34 and 40 which are utilized have the capacity to receive and transmit v.21 rate data, but cannot handle faster rate information. Thus, they cannot process the training string information 18. In order to insure that the length of the microprocessor-generated transmission does not exceed that of the blocked local unit, which would interfere with the subsequently-transmitted training string, the handshake data generated by the microprocessor preferably includes a relatively short preamble portion, typically on the order of 850 milliseconds. This also insures that any transient developed upon switching is safely ahead of the training signal being generated by the local unit. After the modified handshake response is transmitted, the local fax is immediately unblocked by release of relay 44, returning the apparatus to the idle state 54, and allowing the second training string being generated by the local unit to be transmitted to and received by the remote apparatus. With the successful receipt thereof the remote unit generates a CFR signal (Confirmed For Reception) and the actual facsimile image data is transferred. It is within the scope of the invention, however, that the training signal may also be captured by the apparatus at 64, which would eliminate the need for the strict coordination between the micro-processor generated and local fax unit-integrated signals.

Because the apparatus is activated only upon detection of a routing code data string, it can be utilized with a local facsimile apparatus intended to send both routed and unrouted transmissions. As shown in FIG. 4, the apparatus and method of the invention may preferably include mechanisms to return the apparatus to the idle state if routing data is not present, or if excessive wait periods are experienced, signifying a communications break or other operating abnormality.

It is to be appreciated by those skilled in the art that numerous modifications, adaptations and variations of the present invention as specifically described here can be made without departing from the true scope thereof. Thus, the scope of the invention is to be measured with reference to the appended claims.

I claim:

1. A method for modifying a response handshake signal generated by a first communications apparatus in response to a handshake signal generated by a second communications apparatus, said first and second communications apparatus being connected by a bidirectional signal passageway, comprising:

passing said handshake signal generated by said second communications apparatus to the first communications apparatus to initiate the generation of the response handshake signal;

preventing the response handshake signal from reaching said second communications apparatus and routing the response handshake signal to storage while maintaining the connection between said first and second communications apparatus for at least as long as said first communications apparatus is generating said handshake signal;

modifying the stored response handshake signal;

initiating the transmission of a second handshake signal from the second communications apparatus and passing said second handshake signal to the first communications apparatus to cause the first communications apparatus to initiate the generation of a second response handshake signal;

preventing the second response handshake signal from reaching said second communications apparatus; and transmitting the modified handshake signal to the second communications apparatus as a substitute response to said second response handshake signal.

2. The method of claim 1 wherein the steps of preventing the first and second handshake signals from reaching said second communications apparatus comprises the step of disconnecting the first communications apparatus from the signal passageway.

3. The method of claim 1 comprising an additional step of initiating said modification routine upon receipt of a start signal generated by the first communications apparatus prior to the transmission of the response handshake signal from said second communications apparatus.

4. A method for modifying a response handshake signal generated by a calling facsimile unit in response to a handshake signal generated by a called facsimile unit, said calling and called facsimile units being connected by a telephone line, comprising:

initiating a call from the calling facsimile unit to the called facsimile unit and transmitting a data string including the telephone number of the called facsimile unit to a remote telephone routing apparatus over the telephone line;

passing the handshake signal generated by said called facsimile unit in response to the calling facsimile unit to initiate the generation of the response handshake signal;

preventing the response handshake signal from reaching said called facsimile unit and routing the response handshake signal to storage while maintaining the telephone line connection between said calling and called facsimile units;

modifying the stored handshake signal by including a portion of said data string in a handshake field of the handshake signal;

initiating the transmission of a second handshake signal from the called facsimile unit and passing the second handshake signal to the calling facsimile unit to cause the calling facsimile unit to initiate the generation of a second response handshake signal;

preventing the second response handshake signal from reaching said called facsimile unit; and transmitting the modified handshake signal in place of the prevented second response handshake signal to the second facsimile unit.

5. The method of claim 4 wherein the step of preventing the second response handshake signal from reaching said called facsimile unit comprises disconnecting the communications apparatus from the telephone line.

6. The method of claim 4 wherein the step of transmitting the data string includes the appending of the data to be included in the handshake field to the end of the telephone number portion of the data string.

7. The method of claim 6 wherein said appending step includes the placing of a delimiter character at the start and end of the handshake field data.

8. The method of claim 7 wherein the placing step comprises the placing of a start delimiter character which is recognized by the telephone routing apparatus as delimiting a non-telephone number field.

9. The method of claim 4 wherein the handshake signals generated by the calling facsimile unit comprises portions of handshake transmissions, said step of transmitting the modified handshake signal in place of the prevented second response handshake signal includes the step of passing the remaining portion of the second handshake transmission to said called facsimile unit.

10. An apparatus for modifying a handshake data field generated and transmitted by a calling facsimile unit as part of a handshake signal during a communications session between the calling facsimile unit and a remote called facsimile unit coupled by a transmission path, comprising:

means for detecting handshake signals transmitted by said calling and called facsimile units;

means for controlling the coupling of said calling facsimile unit to the transmission path;

means for accepting modification data from said transmission path and for storing and modifying the handshake data field;

means for transmitting the modified handshake data field over the transmission path; and control means coupled to said detection means, coupling control means, storing and modifying means, and transmitting means to cause the diversion from the transmission path of a data field of a first handshake signal generated by said calling facsimile unit and the desired modification thereof, a second handshake signal including said modified data field being transmitted over the transmission path in response to a request for a second handshake signal from said called facsimile unit.

11. The apparatus of claim 10 wherein said detecting means and transmitting means comprise modems.

12. The apparatus of claim 10 wherein said coupling control means comprises a physical or logical relay between said calling facsimile unit and said transmission path.

13. The apparatus of claim 10 wherein said coupling control means further comprises a current source coupled to said calling facsimile unit when said calling facsimile unit is decoupled from the transmission path.

14. The apparatus of claim 10 wherein said data accepting means comprises a DTMF receiver coupled to the transmission path and to said control means.

15. The apparatus of claim 14 wherein said data accepting means includes means for recovering modification data from a telephone dial string.

16. An apparatus for modifying a response handshake transmission of a first communications apparatus, the first communications apparatus coupled to a communications path and generating the response handshake transmission in response to a handshake transmission from a second communications apparatus coupled to the communications path, the apparatus comprising:

- a receiver operative to receive the response handshake transmission from the first communications apparatus;
- a first memory for storing data;
- a second memory for storing the response handshake transmission;
- a microprocessor coupled to the receiver and the first and second memories, the microprocessor operative to modify the response handshake transmission with the data;
- a relay coupled to the microprocessor, the relay operative to selectively connect the first communications apparatus to the communications path;
- a current source coupled to the first communications apparatus operative to selectively simulate the communications path when the first communications apparatus is selectively disconnected from the communications path; and
- a transmitter for transmitting the modified response handshake transmission to the second communications apparatus.

17. A method for modifying in an external apparatus a response handshake signal generated by a first communications apparatus in response to a handshake signal generated by a second communications apparatus, said first and second communications apparatus being connected by a bidirectional signal passageway, comprising:

- passing said handshake signal generated by said second communications apparatus to the first communications apparatus to initiate the generation of the response handshake signal;
- detecting the response handshake signal and preventing in the external apparatus the response handshake signal from reaching said second communications apparatus while maintaining the connection between said first and second communications apparatus;
- modifying the response handshake signal in the external apparatus; and
- transmitting the modified handshake signal to the second communications apparatus.

18. A method for modifying a response handshake signal generated by a first communications apparatus in response to a handshake signal generated by a second communications apparatus, said first and second communications apparatus being connected by a bidirectional signal passageway, comprising:

- passing said handshake signal generated by said second communications apparatus to the first communications apparatus to initiate the generation of the response handshake signal;
- preventing the response handshake signal from reaching said second communications apparatus by disconnecting the first communications apparatus from the signal passageway and routing the response handshake signal to storage while maintaining the connection between said first and second communications apparatus;
- modifying the stored handshake signal;
- initiating the transmission of a second handshake signal from the second communications apparatus and passing said second handshake signal to the first communications apparatus to cause the first communications apparatus to initiate the generation of a second response handshake signal;
- preventing the second response handshake signal from reaching said second communications apparatus by disconnecting the first communications apparatus from the signal passageway; and
- transmitting the modified handshake signal to the second communications apparatus as a substitute response to said second response handshake signal.

19. The method of claim 18 wherein the step of maintaining connection between the first and second communications apparatus is performed for at least as long as said first communications apparatus is generating said response handshake signal.

20. A method for modifying a response handshake signal generated by a first communications apparatus in response to a handshake signal generated by a second communications apparatus, said first and second communications apparatus being connected by a bidirectional signal passageway, comprising:

- passing said handshake signal generated by said second communications apparatus to the first communications apparatus to initiate the generation of the response handshake signal;
- preventing the response handshake signal from reaching said second communications apparatus and routing the response handshake signal to storage while maintaining the connection between said first and second communications apparatus;
- modifying the stored handshake signal;
- initiating the transmission of a second handshake signal from the second communications apparatus and passing said second handshake signal to the first communications apparatus to cause the first communications apparatus to initiate the generation of a second response handshake signal;
- preventing, upon detection of the second handshake signal, the second response handshake signal from reaching said second communications apparatus; and
- transmitting the modified handshake signal to the second communications apparatus as a substitute response to said second response handshake signal.

* * * * *